June 2, 1931.                C. A. SERRIADES                1,808,439
                       AIRCRAFT POWER GENERATING SYSTEM
                             Filed Sept. 19, 1927
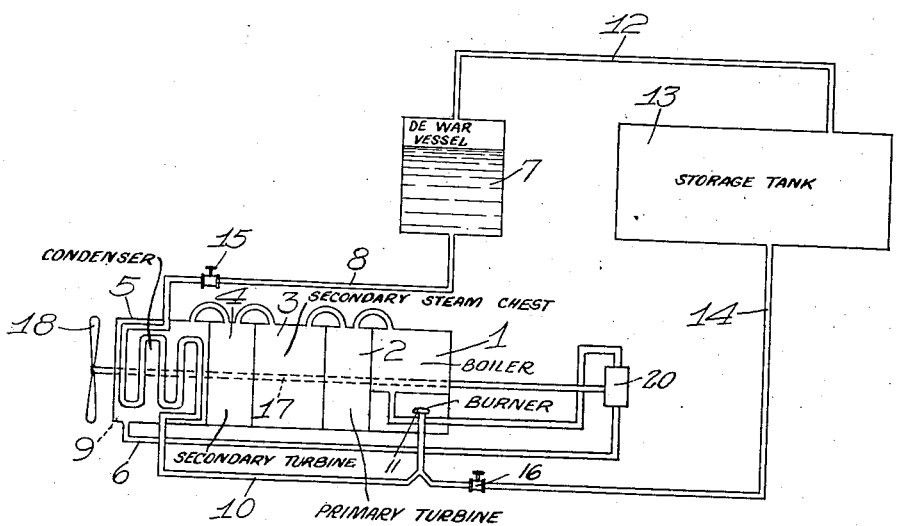
INVENTOR
C.A. SERRIADES
BY
ATTORNEY Patented June 2, 1931

1,808,439

UNITED STATES PATENT OFFICE

CONSTANTINE A. SERRIADES, OF CHICAGO, ILLINOIS

AIRCRAFT POWER GENERATING SYSTEM

Application filed September 19, 1927. Serial No. 220,576.

My invention relates to improvements in aircraft power generating systems, and it consists in the combinations, constructions, and arrangements herein described and claimed.

An object of the invention is to provide a system, by means of which power may be generated for aircraft without the necessity of burdening the aircraft with a considerable weight of fuel, such as that of the ordinary gasoline.

A further object is to provide a system of generating power in which liquid hydrogen is vaporized and in which a motive fluid, such as steam, is condensed by the transfer of heat from the steam to the hydrogen in the act of vaporizing the latter, thus conserving the water necessary to provide the steam.

A further object is to provide a system in which the troubles incident to explosive motors will be eliminated.

A further object is to provide a power system which is not subject to the disadvantages such as loss of power at high altitudes that are inherent in gasoline motors.

A further object is to provide a power system in which liquid hydrogen is used, the hydrogen having approximately three times the thermal value of gasoline and thus constituting a load of one third of the equivalent amount of gasoline or being capable of propelling the aircraft three times as far as the same weight of gasoline.

Other objects and advantages will appear in the following specification, and the novel features of the invention will be particularly pointed out in the appended claims.

My invention is illustrated in the accompanying drawing, forming part of this application, in which the figure is a diagrammatic view showing the general arrangement of the parts.

In carrying out my invention, I make use of an aircraft of any suitable type and which is preferably provided with steam turbines for propelling the aircraft. In the drawing, I have shown a boiler at 1 which is connected with a primary turbine 2, the latter being connected with a secondary steam chest 3 which is in turn connected with a secondary turbine 4. At 5 I have indicated diagrammatically a condenser. This condenser is connected with the boiler by a return pipe 6.

The liquid hydrogen, which may be liquefied by any approved process, is contained in the vessel 7 which is preferably a so-called De War vessel of a well known type for containing liquefied gases at low temperatures. This vessel is connected by means of a pipe 8 with a coil 9 in the condenser 5. The opposite end of this coil is connected by the pipe 10 with a burner 11 underneath the boiler 1.

The upper portion of the De War vessel is connected by a pipe 12 with a storage tank 13 for gaseous hydrogen, and this tank 13 communicates by means of a pipe 14 with the burner 11. Suitable control valves 15 and 16 are provided, as shown.

From the foregoing description of the various parts of the device, the operation thereof may be readily understood. The fluid, such as water, mercury, or other motive fluid, is placed in the boiler 1 and the liquid hydrogen in the receptacle 7. The hydrogen tends to vaporize or gasify and passes by means of a pipe into the tank 13 and may be admitted from the pipe 14 to the burner 11 which may be of any suitable type and where the gaseous hydrogen is burned to heat the boiler 1. The steam generated in the boiler passes through the primary turbine 2, secondary steam chest 3, and the secondary turbine 4, which of course have connections, not shown, with the shaft 17 that drives the propeller 18. The steam passes on from the turbine 4 into the condenser 5 and here it is condensed by giving off its heat to the liquid hydrogen which may be drawn from the receptacle 7 through the pipe 8. The hydrogen is thereby vaporized and may be passed by the pipe 10 to the burner 11 for heating the boiler. The condensed liquid from the condenser 5 is returned by the pipe 6 to the boiler to be again vaporized and to be used as motive fluid.

It will be seen that the liquid hydrogen serves a double function; namely, as a fuel for heating the motive fluid, and as a refrigerating medium or condensing medium. Since hydrogen has three times the thermal value of the same weight of gasoline, it will be apparent that the weight which it is necessary to carry for a flight of a given distance is one-third of that of gasoline. One pound of gasoline contains 18,000 B. t. u. and a pound of hydrogen will contain a minimum of 53,000 B. t. u. The above B. t. u. ratio will define specifically what I mean by the hydrogen possessing three times the thermodynamic efficiency of the same weight of gasoline.

Internal combustion engines are unreliable as compared with a device such as a steam turbine. There are many factors that cause this unreliability, such as failure in ignition, loss of power in high altitudes, sticking valves, etc. In the present instance, the arrangement is simplified, since the hydrogen is merely burned and the steam or other vapor generated by the heat of the burning hydrogen operates directly on the turbine to provide the motive power. The intense cold of liquid hydrogen renders it particularly efficient as a condensing medium, thereby reducing the size of the condenser and consequently its weight.

While I have mentioned a steam turbine as being an effective means for use with aircraft, this is by way of illustration only, since it is obvious that other forms of motors might be used without departing from the spirit or the scope of the invention.

A suitable pump 20 may be associated with the pipe 6 for feeding condensate from the condenser to the boiler. While I have shown a rotary pump, any one of the types of pumps common in the art may be employed.

I claim:

1. A power generating system for aircraft comprising a motor, a boiler for vaporizing liquid to drive the motor, a condenser for condensing the exhaust vapor from the motor, a source of liquid hydrogen, means within the condenser for subjecting the liquid hydrogen to the heat of the exhaust vapor, whereby the hydrogen is vaporized and the exhaust vapor is condensed to liquid form, and means for conveying the vaporized hydrogen to the burner.

2. A power generating system for aircraft comprising a motor, a boiler for vaporizing liquid to drive the motor, a condenser for condensing the exhaust vapor from the motor, a source of liquid hydrogen, means within the condenser for subjecting the liquid hydrogen to the heat of the exhaust vapor, whereby the hydrogen is vaporized and the exhaust vapor is condensed to liquid form, means for returning the condensed liquid to the boiler, and means for conveying the vaporized hydrogen to the burner.

CONSTANTINE A. SERRIADES.